United States Patent
Kundrat et al.

(10) Patent No.: US 10,661,377 B2
(45) Date of Patent: May 26, 2020

(54) MANUFACTURING DEVICE AND MANUFACTURING METHOD

(71) Applicant: AMADA MIYACHI EUROPE GMBH, Puchheim (DE)

(72) Inventors: Jörg Kundrat, Germering (DE); Koen Geentjens, Dessel (BE)

(73) Assignee: AMADA MIYACHI EUROPE GMBH, Puchheim (DE)

( * ) Notice: Subject to any disclaimer, the term of this patent is extended or adjusted under 35 U.S.C. 154(b) by 398 days.

(21) Appl. No.: 15/127,556

(22) PCT Filed: Mar. 23, 2015

(86) PCT No.: PCT/EP2015/056110
§ 371 (c)(1),
(2) Date: Sep. 20, 2016

(87) PCT Pub. No.: WO2015/140345
PCT Pub. Date: Sep. 24, 2015

(65) Prior Publication Data
US 2017/0136568 A1    May 18, 2017

(30) Foreign Application Priority Data

Mar. 21, 2014   (NL) ........................................ 2012493
Jul. 3, 2014   (DE) ..................... 20 2014 103 058 U

(51) Int. Cl.
*B23K 11/00*   (2006.01)
*B23D 65/00*   (2006.01)

(52) U.S. Cl.
CPC .......... *B23K 11/0006* (2013.01); *B23D 65/00* (2013.01); *B23K 11/002* (2013.01)

(58) Field of Classification Search
CPC ..... B23K 11/11; B23K 11/115; B23K 11/002; B23K 11/004; B23K 11/0046; B23K 11/0006; B23D 65/00
See application file for complete search history.

(56) References Cited

U.S. PATENT DOCUMENTS

| 3,718,799 | A |   | 2/1973 | Mitsuyoshi et al. |
| 4,864,896 | A |   | 9/1989 | Pfaltzgraff |
| 5,295,417 | A |   | 3/1994 | Beck et al. |
| 5,931,369 | A | * | 8/1999 | Hellbergh .............. B23D 65/00 228/103 |

FOREIGN PATENT DOCUMENTS

| DE | 197 52 140 A1 | 6/1998 |
| JP | H03 121717 A | 5/1991 |
| WO | 02/16072 A1 | 2/2002 |

* cited by examiner

*Primary Examiner* — Christopher S Kim
(74) *Attorney, Agent, or Firm* — McGlew and Tuttle, P.C.

(57) ABSTRACT

A manufacturing device (1), and a method for manufacturing saw blades (2) and for welding or soldering individually fed cutting elements (4) on a fed, toothed base blade (3) uses an electrical pressure welding device (6) having an advanceable welding head (14). The relative position of the base blade (3) and the welding head (14) in the process area is detected by an automatic adjusting device (9) and, if necessary, adjusted or readjusted.

23 Claims, 10 Drawing Sheets

MANUFACTURING DEVICE AND MANUFACTURING METHOD

CROSS REFERENCE TO RELATED APPLICATIONS

This application is a United States National Phase Application of International Application PCT/EP2015/056110 filed Mar. 23, 2015 and claims the benefit of priority under 35 U.S.C. § 119 of Netherlands Application 2012493 filed Mar. 21, 2014 and German Application 20 2014 103 058.1 filed Jul. 3, 2014, the entire contents of which are incorporated herein by reference.

FIELD OF THE INVENTION

The present invention pertains to a manufacturing device and to a manufacturing method for saw blades, especially band saw blades, especially for welding or for soldering individual cutting elements at receiving points on a fed base blade, especially base band saw blade, with a cutting element feed and with an electrical pressure welding device with an advance able welding head.

BACKGROUND OF THE INVENTION

Such a manufacturing device for circular saw blades is well known from U.S. Pat. No. 4,864,896 A. The saw blade consists of a base blade and cutting elements, which are welded onto the tips of tooth sections on the base blade. This occurs by means of an electrical pressure welding device, and especially an electrical resistance welding device. This device is equipped with a pivoting, advance able welding head, on the electrode of which an individual cutting element is mounted, pressed onto the receiving point and welded by electric current by means of the resistance heat at the welding point. In this case, the cutting element is pressed flatly onto a radial front side of the tooth section and is pressed into the tooth material. Tooth tolerances do not play a role in this connection.

DE 21 35 628 A1 discloses a similar manufacturing device for band saw blades which are guided obliquely upward, wherein troughs prepared at the tooth tips are provided for receiving spherical cutting elements, which are inserted there by a feed. A welding head with vertical advancing of the electrode welds the cutting element on with current and pressure. The manufacturing device has, further, a band saw blade feed and a cutting element feed.

SUMMARY OF THE INVENTION

An object of the present invention is to provide improved manufacturing technology for saw blades, especially band saw blades.

The present invention concerns the manufacturing of saw blades, cutting elements being joined to the teeth of a base blade. This is preferably carried out by an electrical resistance pressure welding. As an alternative, other joining techniques are possible, e.g., soldering with electrical resistance heating of the process area under pressing pressure. The electrical pressure welding device may be used for soldering as well.

The relative position of the base blade, especially the base band saw blade and of the welding head in the process area can be detected and adjusted and readjusted precisely, if necessary, by means of an automatic adjusting device. In this case, the base blade can be moved in one or more directions in relation to the welding head or the welding head in relation to the base blade or both in relation to one another. As a result of this, constant and optimal process results, especially welding results are achieved. Any changes in position of the receiving point can be compensated by adjusting, so that there are defined and constant contact conditions in situ between the receiving point and the cutting element for joining, especially electrical resistance welding or soldering.

The cutting element may have different configurations, e.g., triangular, spherical or cylindrical. It can be received by the movable electrode on the welding head and be advanced to the receiving point on the base blade as well as be held in position there for joining. A lateral centering is also possible in this case. The cutting element can be fed by means of a feed device separately from a reservoir to the electrode on the welding head and be fixed there to a mount in a positive-locking manner and by means of suction or under vacuum.

The manufacturing technology may, further, comprise a testing technology, with which the process or welding result can be checked or possibly recorded. A quality assurance is possible by means of the testing. It can be determined whether the position of the joined, especially welded or soldered cutting element on the base blade is within the predefined tolerances and is especially central. In addition, the shape and the dimensions of the band saw blade, especially the cutting elements, can be checked. This is of great importance for the later use of the band saw blade and especially for the guiding thereof on the sawing machine. The testing technology, i.e., the testing device and the testing method, has its own inventive relevance and can also be used in conventional manufacturing devices without automatic adjusting technology.

The manufacturing device is preferably equipped with an aftertreatment device for the band saw blade with the welded-on cutting elements. The aftertreatment may be especially of a thermal nature and be carried out by means of a heating device. In this case, an inductive heating device with a coil is preferably used. The quality of the welded saw blade, especially band saw blade, can be affected positively by the aftertreatment, especially subsequent heating, being carried out with a distance in time and space after the joining. In particular, welding distortions, undesired structural changes or the like can be eliminated. The aftertreatment process can also be adjusted by means of a suitable sensory temperature detection. The claimed aftertreatment technology, in particular the aftertreatment device and the aftertreatment method, also has its own inventive relevance and may be used in combination with a conventional manufacturing device without adjusting device and/or without testing device for the joining or welding result.

The electrical pressure welding device may also be modified and improved compared to the state of the art. It may especially comprise a shielding gas device, which ensures constant and reproducible welding conditions in the process area. The shielding gas technology, i.e., the shielding gas device and the shielding gas method, also has its own inventive relevance and may also be used in a conventional manufacturing device without automatic adjusting technology and/or testing technology and/or aftertreatment technology.

One embodiment of the present invention pertains to a processing unit and to the carrying out of a repetitive workpiece processing, of a workpiece, which comprises a series of consecutive segments, each with a target surface, on which the processing shall be carried out. These include displacing devices, which are configured to be able to receive the workpiece and to displace the workpiece between consecutive processings, over a nominal distance in the first direction, into a nominal position. This also includes a processing unit with a processing element, which can be advanced along a working line, over a nominal proximity distance, to the target surface in order to carry out the processing on the target surface.

Such a processing unit is adapted to repeat the same processing on the workpiece in consecutive segments. An exemplary embodiment for this is a manufacturing device or production machine, with which hardened saw tooth tips are welded or soldered onto a saw blade. In this respect, the workpiece usually comprises a saw blade with consecutive segments, each with a saw tooth on it, which saw blade has been punched or otherwise removed from a blade and possibly afterprocessed. This workpiece is guided past in steps to a welding head in the longitudinal direction by means of displacing means suitable for this, wherein every individual saw tooth tip is positioned in each segment and welded onto the target surface of the saw tooth. In this case, the target surface is usually located ca. half way to a saw tooth and frequently has a certain oblique position with regard to the longitudinal direction of the saw blade. The step size, of the conveying of the workpiece carried out in steps, corresponds to the nominal pitch distance between the consecutive saw teeth in this respect.

The problem arises hereby that deviations in height, width and position of the individual saw teeth may occur due to virtually unavoidable production tolerances. Consequently, the position of the target surface would vary whenever a saw tooth is brought in steps into a previously fixed, precise position. As a consequence, a saw tooth tip is not or not precisely fastened to the target surface, as a result of which the saw blade, as a whole, may be scrap.

With the claimed manufacturing technology, among other things, a processing unit is provided, with which processing can be precisely repeated on consecutive segments, without reducing the passing speed of the workpiece through the processing unit all that much.

In order to achieve the intended goal, the processing unit is equipped with detection means which are configured to be able to numerically detect a deviation at least in the first direction of the target surface with regard to the working line, wherein correction means are coupled with the displacing means and with the processing unit, wherein the correction means control the displacing means at least during the operation to eliminate the deviation in the first direction, and that the correction means adjust the processing unit at least during the operation to make a correction of the proximity distance corresponding to the deviation in the first direction at the processing element.

In each segment, a deviation from the target surface, with regard to a nominal position, i.e., a defined position thereof, in the form of a deviation from the working line of the processing element, is fixed, i.e., with regard to the trajectory, to which the processing element is sent out each time to the target surface of the workpiece in order to carry out the intended processing on it. Usually, it is a linear working line, but the term working line can be further interpreted within the framework of the present invention, so that trajectories that are curved and otherwise deviate from a straight line are also defined by it.

In order to determine said deviation with regard to the working line, in this variant of the adjustment a repositioning of the workpiece in the form of a small correction, which is carried out by means of the displacing means in order to bring the target surface again into the normal path of the processing element, is sufficient. A correction of the proximity distance corresponding thereto, via which the processing element is sent to the target surface, can be derived from this correction. By means of applying this correction to the processing element and thus by means of the conform correction of the proximity distance, it is achieved that the processing element will act precisely at the point on the target surface and will carry out the processing correctly with regard to the nominal position of the corrected position of the workpiece as well. Thus, it is possible by mere use of already suitable displacing devices of the processing element and of the workpiece to react quickly and suitably to deviations in the vertical direction transversely to the displacing direction without the processing speed being significantly jeopardized.

A special embodiment of the processing unit provides for the processing element to comprise a receiving element, which is configured to be able to receive a partial piece or cutting element at least temporarily and to place it into a predefined orientation on the target surface. Said partial piece can thus be automatically received, aligned and placed on the target surface. The processing unit is a component of a welding device, especially of an electrical resistance welding device, wherein the receiving element originates from a welding electrode of the welding device. Thus, the partial piece may also be fastened to the target surface by welding, which is understood to include soldering as well within the framework of the present invention.

In another special embodiment of the processing unit, the target surface of each segment has an oblique position with regard to the first direction, the working line of the processing element being aligned approximately transversely to this oblique position, and the workpiece being a saw blade made of metal and the partial piece being a saw tooth that is connected to the target surface. Thus, the processing unit is intended and suited to carry out the processing on a saw blade, in which a hardened saw tooth tip is fastened to each saw tooth in order to give the saw blade, as a whole, more hardness, durability and robustness.

The detection means can, in principle, be applied in different ways, both with contact and without contact. However, a contactless detection is assumed in a preferred embodiment of the processing unit. For this, the processing unit in said preferred embodiment is characterized in that the detection means comprise an image sensor, especially an image sensor of an electronic camera system, which is aligned toward the nominal position. The correction devices comprise, in addition, the image processing unit necessary for an analysis of the camera image in order to detect the target surface from an image recording and to determine the deviation from the target surface with regard to the working line.

In order to avoid the workpiece from being moved slowly but surely in the vertical direction during its passage through the processing unit, for example, because of tensions present in it, a displacing device for a workpiece is provided, which is characterized by displacing means, which comprise a first clamping device and a second clamping device, the clamping means of each being controllable in order to clamp or release the workpiece mainly horizontally and mainly transversely to a displacing device, and these are mounted at offset positions in the displacing direction, and in order to avoid the displacing devices from controlling one of the first and second clamping devices at least during the operation in case of offsetting a workpiece, in order to release the workpiece, while the displacing devices control the other of the first and second clamping devices in order to clamp in the workpiece. Thus, the displacing devices offer the workpiece the freedom to rotate downwards during the release by one of the clamping devices into the other clamping device under the effect of gravity and then the other way around in case of the other clamping device. The result is that the workpiece is always pushed back downwards and thus a vertical creeping is limited.

Besides in the longitudinal direction, i.e., in the conveying direction of the workpiece, a correction in the width direction, i.e., transversely to the conveying direction may also be desirable or self-triggering under the circumstances. For this, another special embodiment of the processing unit provides for detection means to be mounted, which are configured to be able to numerically detect in the second direction, mainly transversely to the first direction, a deviation from the target surface with regard to the working line, wherein the processing element originates from a first manipulator, the first manipulator originating from a second manipulator, which is configured to be able to apply an offset in the second direction in case of the first manipulator, and the correction means being coupled with the second manipulator in order to offset the first manipulator into the second direction, at least during the operation, in order to eliminate the deviation in the second direction. For the width correction, the working line of the processing element is correspondingly adapted by a proportional sending out of the first manipulator from the starting point of the processing element. For the rest, the above-described correction of the possible deviation from the target surface with regard to the offset working line takes place in the direction of offset, if necessary.

Detection means of a different type may also be used for the width correction, but the contactless detection means have preference. Another preferred embodiment of the processing unit according to the present invention is, in addition, characterized in that the detection means comprise a first and a second image sensor, especially an image sensor of an electronic camera system, the first image sensor recording the nominal position in the second direction and the second image sensor recording the nominal position in the first direction. Thus, connection is sought in the detection means of the same type, as they are preferably also applied to the first detection means. Image detection means and image processing means, usually in the form of software, which can be used for the detection of the first deviation, may thus be used for a determination of a possible second deviation as well.

The present invention also pertains to a method for carrying out a repetitive processing process on consecutive segments of a workpiece, especially on one for which the processing unit described above here is used, the segments being offset in the first direction one behind the other toward the nominal position and a processing element being brought along a working line over a proximity distance to the target surface. Such a method provides for a deviation in the first direction of the target surface of the segment with regard to the working line of the processing element to be numerically determined in the nominal position per segment, for an offset of the workpiece in the first direction to be carried out in order to eliminate the deviation in the first direction, and for the proximity distance before the offset of the workpiece into the first direction, which eliminates the deviation, is corrected.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
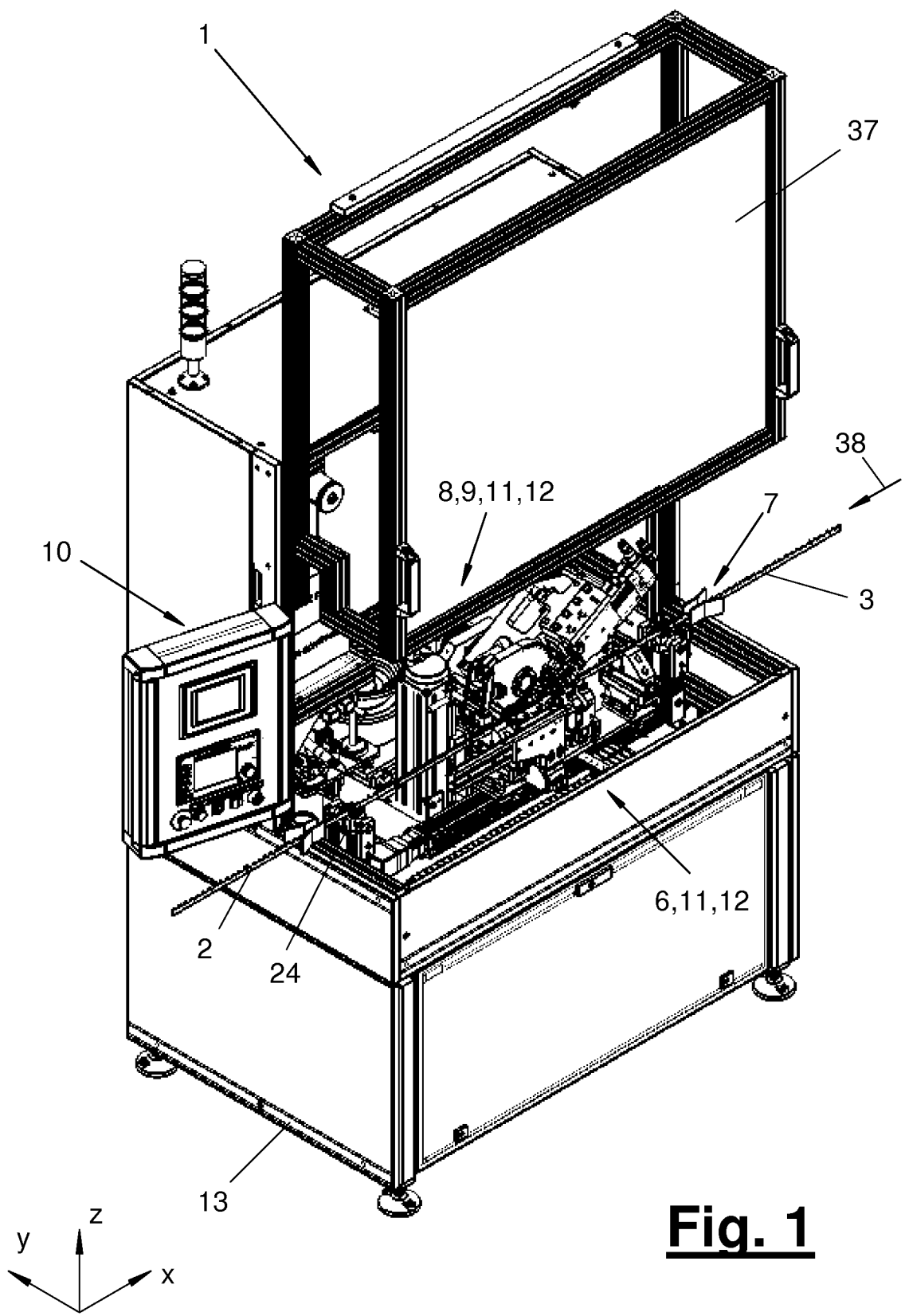
FIG. 1 is a perspective view of a manufacturing device for band saw blades.
Figure 2:
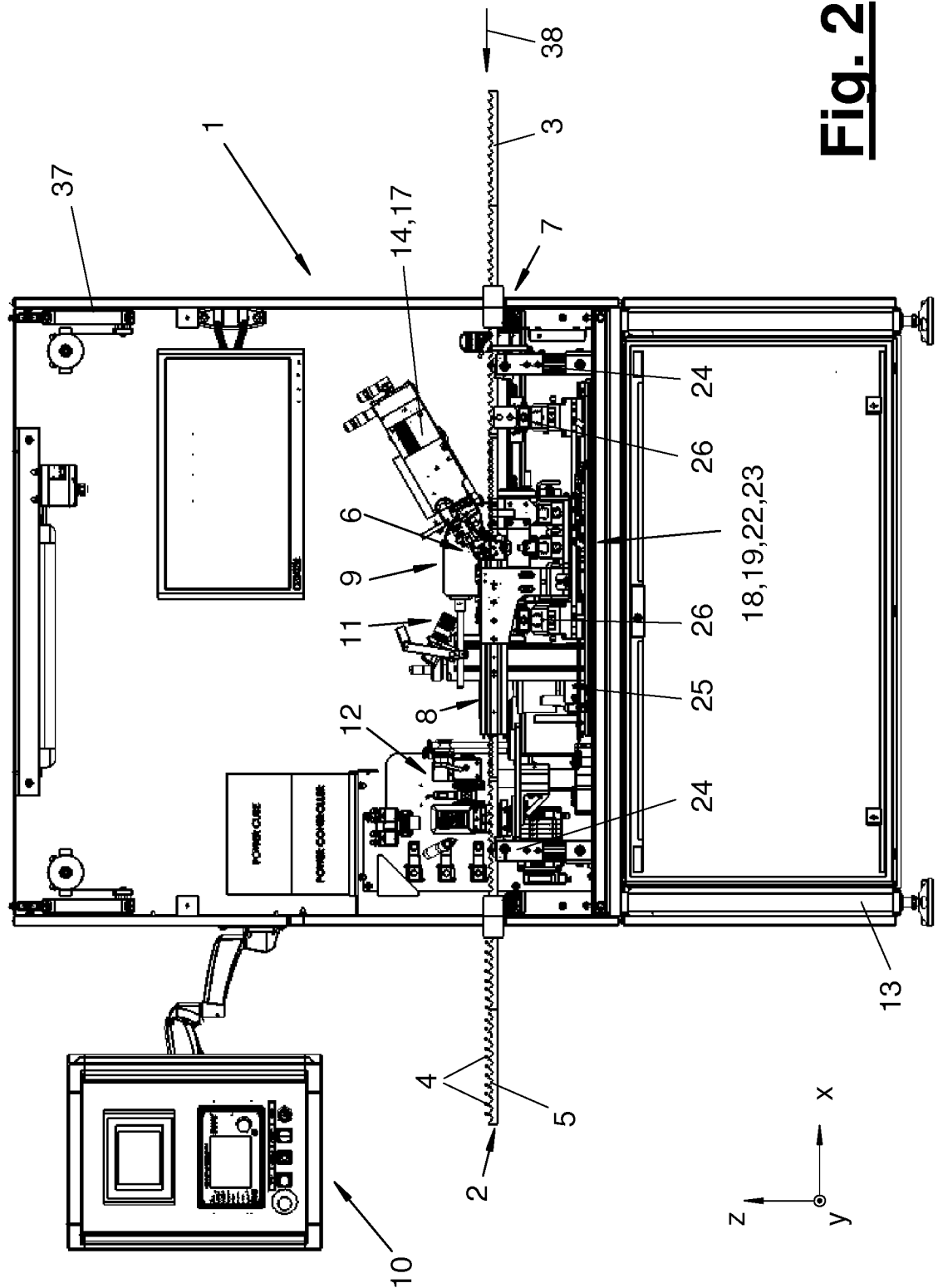
FIG. 2 is a front view of the manufacturing device from FIG. 1 with open shielding device.

Referring to the drawings, the present invention pertains to a manufacturing device (1) and to a manufacturing method for saw blades, especially band saw blades (2).

Figure 7:
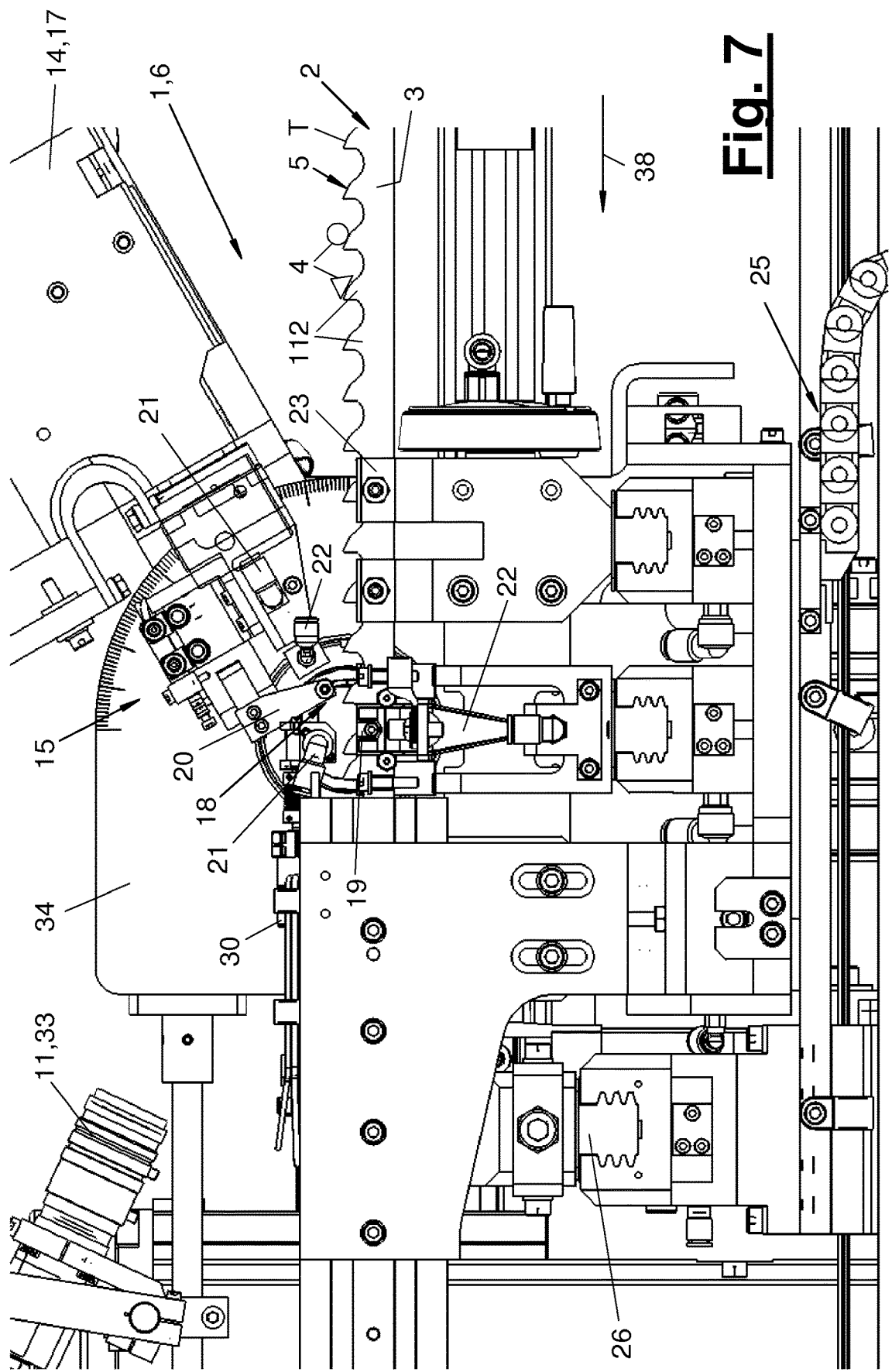
FIG. 7 is an enlarged, front-side detail view of FIGS. 2 and 5.

The band saw blades (2) consist of a flexurally elastic, thin-walled base band saw blade (3), onto which a plurality of individual cutting elements (4, 115) are welded at a predefined receiving point (5) each. As FIG. 7 illustrates, the base band saw blade (3) has on the top side a contour with projections (112) which are tooth-like and uniformly spaced apart in the axial direction (38) of the band saw blade (2). The projections (112) have on the top side a tapered area, which is also designated as target surface (T) and which forms the receiving point (5) for an individual cutting element (4, 115). FIGS. 7 and 9 through 14 also illustrate this arrangement.

The cutting element (4, 115) is formed by a material that is harder and more suitable for the cutting process than the base band saw blade (3). Both materials are electrically conductive. The base band saw blade (3) consists, e.g., of metal, especially spring steel, and the cutting element (4) consists, e.g., of hard metal, a tungsten or carbide compound or the like. The cutting element (4, 115) has a shape that is suitable for the cutting process and for connection to the receiving point (5). It may be configured, e.g., as a sphere or as a roller, which is welded to the receiving point (5) at the rounded area. In another embodiment shown in FIGS. 9 through 14, the cutting element (4) may have an essentially triangular shape as a saw tooth tip (115) with an arched edge for contact with the receiving point (5). FIG. 7 shows schematically different shapes in the right-side area.

The bonding or so-called joining of the cutting elements (4) with the base band saw blade (3) is carried out by electrical resistance welding or soldering under pressing pressure. Due to the shape of the receiving point (5) and of the cutting element (4), the area in which they contact each other is reduced, which leads to a local concentration and increase of the current flow and to a heating of the contact areas by the electrical resistance.

FIG. 1 shows the manufacturing device (1) with a machine frame (13), at which a pressure welding device (6) and a shielding device (37) are arranged. In the operating position, the shielding device (37) protectively surrounds the process area at the pressure welding device (6). FIG. 1 shows the opened position. A base band saw blade (3) is fed to the pressure welding device (6) by means of a band saw blade feed (7) in the arrow direction (38) or in the machine-related x direction, wherein, after welding on the cutting elements (4), the fitted band saw blade (2) is discharged on the opposite side. The manufacturing device (1) has, further, a cutting element feed (8) and a control device (10).

The electrical pressure welding device (6) comprises an electrode (19) that is stationary or fixed to the frame and a movable electrode (18). The electrodes (18, 19) are preferably arranged one above the other, but may, as an alternative, also assume a different position in relation to each other. The movable electrode (18) is arranged at a welding head (14), which advances the movable electrode (18) to the base band saw blade (3) by means of an advancing device (17). The movable electrode (18) is arranged in an electrode holder, which is in turn connected to the advancing device (17) and to a current feed. The controllable advancing device (17) has, e.g., a pneumatic or electromechanical linear drive. The movable electrode (18) may be changeably arranged at the electrode holder or at the welding head (14). FIG. 10 shows the movable or upper electrode (18). It is not visible in FIGS. 1 through 9.

The movable electrode (18) has, according to FIG. 10, a mount (126) for a cutting element (4) on its front side. The mount (126) is adapted in its shape to the shape of the cutting element (4) and has a corresponding positive-locking contour for this. The electrode (18) is, further, connected to a suction device (21), which opens in the area of the mount (126) and holds onto the mounted cutting element (4) under vacuum.

Figure 8:
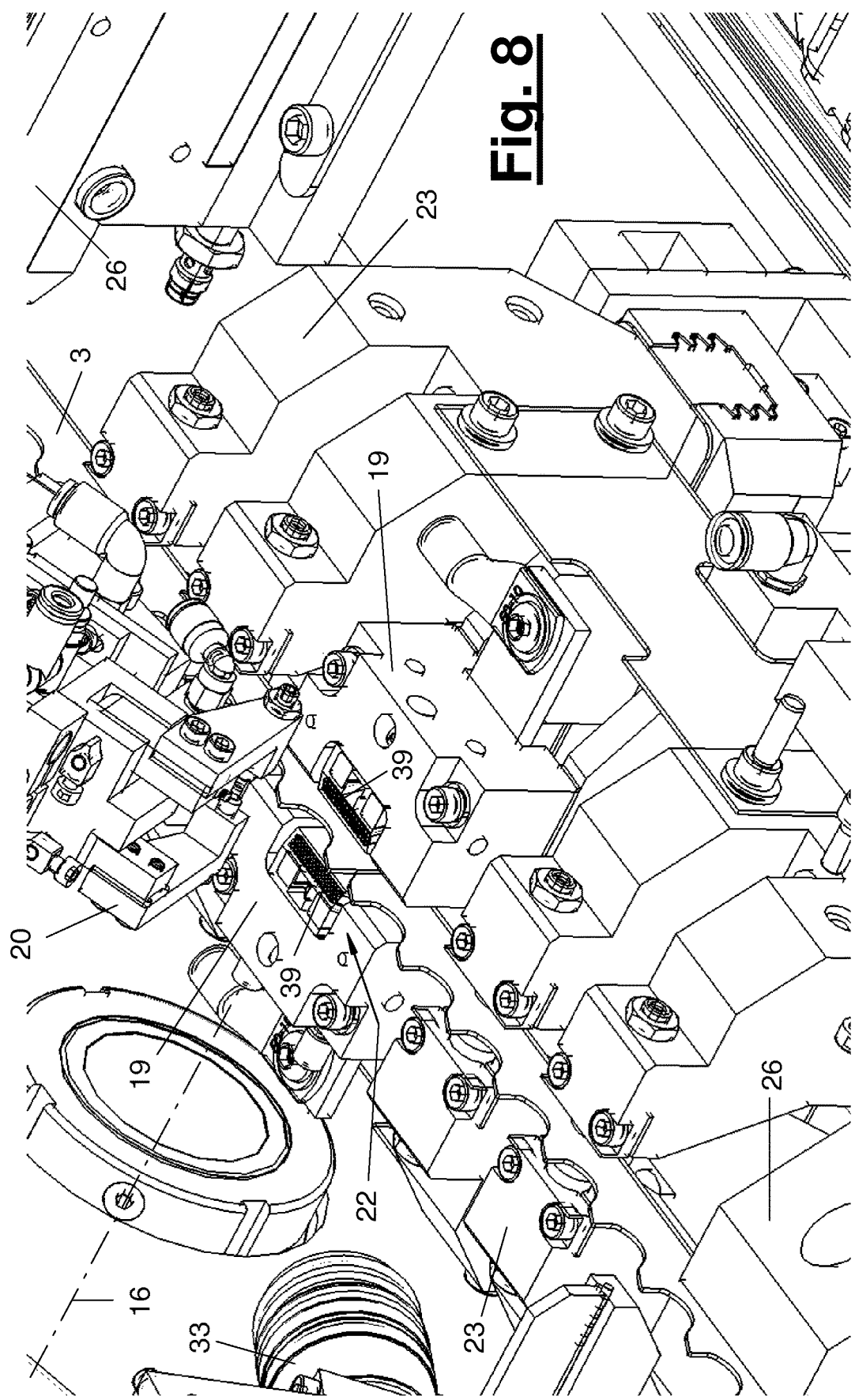
FIG. 8 is an enlarged perspective detail view of the process area on the stationary electrode.

Further, a centering device (20), which is likewise mounted on the electrode holder and with which the mounted cutting element (4) is centered on the mount (126), is associated with the electrode (18) according to FIG. 8. This centering takes place in a y direction transversely to the axial extension in the x direction and to the feed direction (38) of the base band saw blade (3). The centering device (20) has, e.g., two controlled centering jaws advance able on both sides to the cutting element (4).

The stationary and preferably lower electrode (19) is mounted rigidly on the machine frame (13) by means of an electrode holder and is likewise connected to the current feed. The stationary electrode (19) has electrode jaws which can be electrically conductively pressed onto the base band saw blade (3) on both sides. FIG. 8 shows this arrangement.

A likewise stationary, controllable tensioning device (23) with clamping jaws, which clamps and fixes the base band saw blade (3) in the processing or welding position, may be associated with the stationary electrode (19). The tensioning device (23) may be electrically insulated, e.g., by means of a contact element made of ceramic on the clamping jaws. In the embodiment shown according to FIG. 8, such tensioning devices (23) are arranged in the axial direction (38) in front of and behind the stationary electrode (19).

The pressure welding device (6) is provided with a shielding gas device (22). This shielding gas device has a shielding gas supply and one or more outlet nozzles (39) for the shielding gas in the electrode area, which direct the shielding gas flow to the process or welding area.

As FIGS. 7 and 8 illustrate, one or more outlet nozzles (39) are arranged at the stationary electrode (19) and directed upwards in the electrode position shown. They are preferably integrated into the stationary electrode (19). They are arranged, e.g., each in central recesses of fork-shaped electrode jaws and thereby arranged directly at the base band saw blade (3). The fork arms of the electrode jaws enclose the electrically insulated outlet nozzle (39) and press on both sides in the closed position for transmitting current toward the base band saw blade. One or more outlet nozzles (39) may likewise be arranged at the movable electrode (18).

Figure 5:
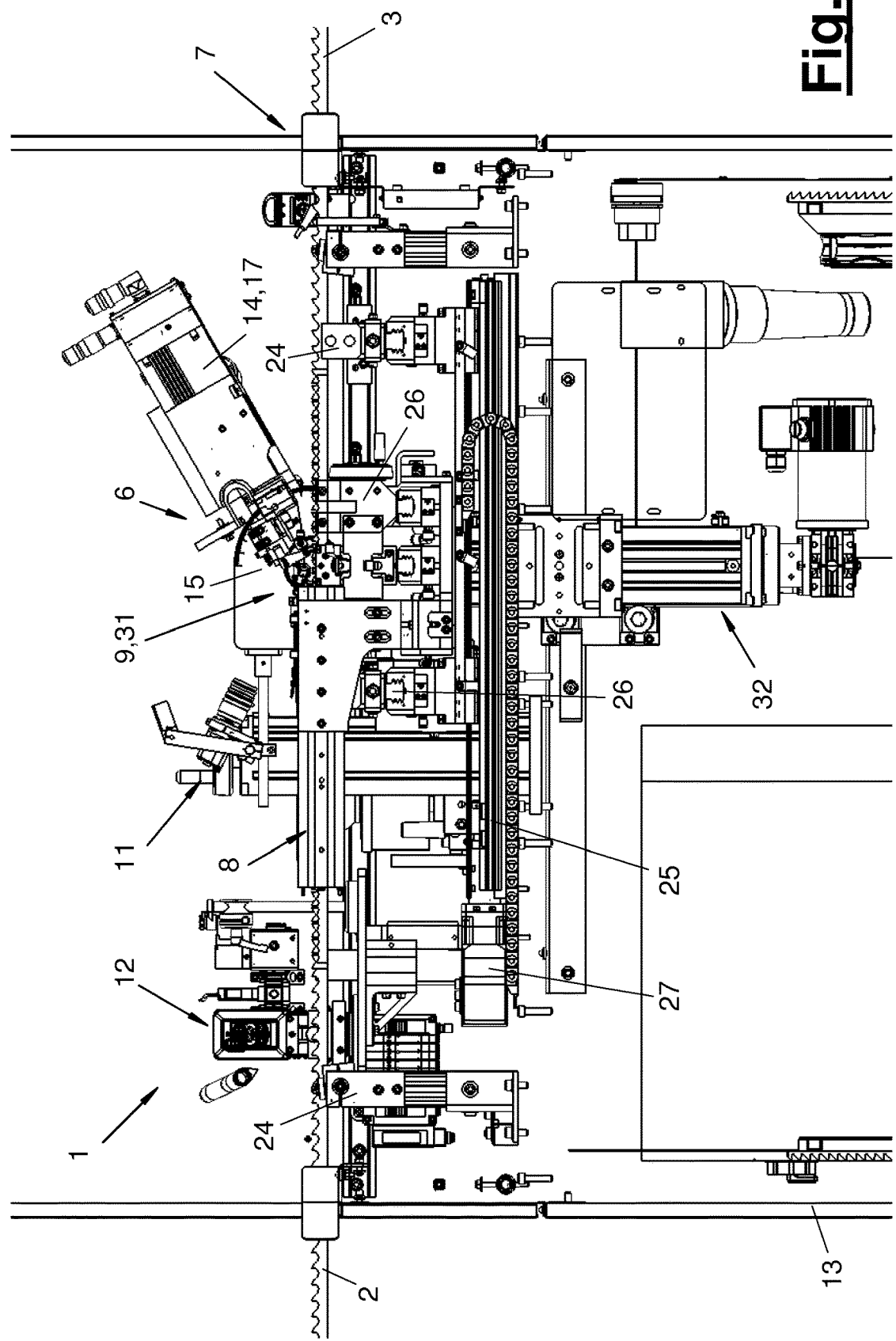
FIG. 5 is an enlarged front view according to FIG. 2.
Figure 6:
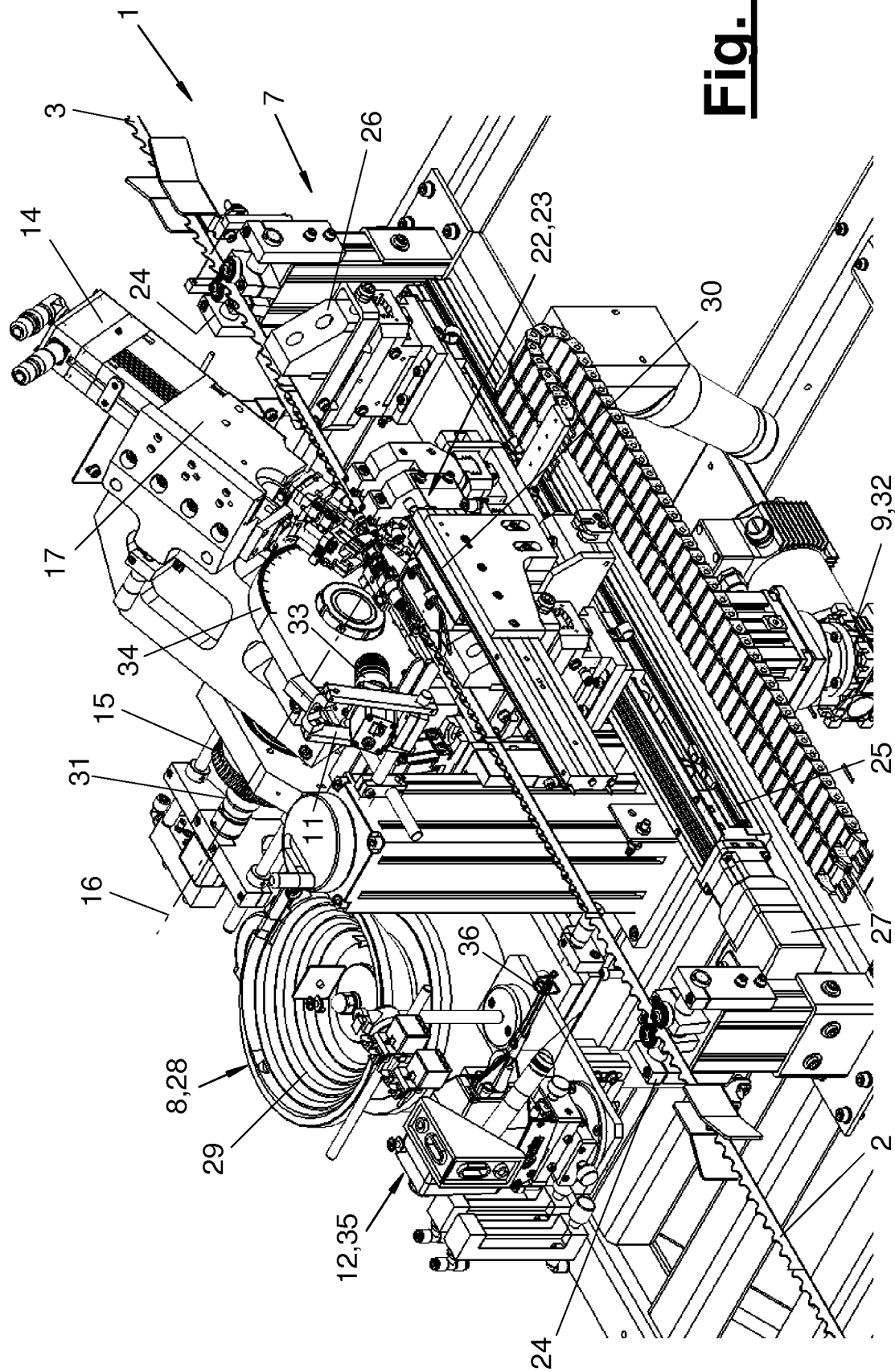
FIG. 6 is an enlarged perspective detail view of FIG. 3.

The manufacturing device (1) has a band saw blade feed (7), which is shown in FIGS. 5 and 6, for the preferably upright aligned base band saw blade (3). This band saw blade feed (7) comprises, on the one hand, one or more band saw blade feeds (24) on the input side and output side of the manufacturing device (1). These support and guide the base band saw blade (3). The guiding may be carried out, e.g., by means of one lower and two lateral, freely rotatable guide rollers. The lateral rollers may have an oblique pitch, namely such that they press downwards against the guide roller during the conveying of the base band saw blade (3). The preferably stationarily arranged band saw blade guide (24) defines the vertical position of the base band saw blade (3) in the process area.

The band saw blade feed (7) has, further, a feed device (25) for the base band saw blade (3). The feed device (25) may provide a continuous or intermittent feed of the base band saw blade (3) or band saw blade (2). The intermittent variant, in which the feed device (25) carries out a reversing feed motion, is shown in the exemplary embodiments.

The feed device (25) comprises, according to FIGS. 5 through 7, a carriage, which is displaceably mounted in the axial or feed direction (38) or in the x direction at the machine frame (13) and is connected to a controllable drive (27). Controllable clamping devices (26), which act on the base band saw blade (3) on both sides with possibly electrically insulated clamping jaws and clamp this blade, are arranged on the carriage in the axial direction in front of and behind the process area, the electrodes (18, 19) and the tensioning devices (23).

The tensioning devices (23) and the clamping devices (26) alternately fix the base band saw blade (3). For the feed, the clamping devices (26) fix the base band saw blade (3) and move it forwards in the axial and feed direction (38), the tensioning devices (23) and the stationary electrode (19) being opened at the same time. The increment of the intermittent feed may correspond to the tooth pitch or to the tooth spacing of the base band saw blade (3). At the end of the feed step, the tensioning devices (23) engage again and fix the base band saw blade (3). The clamping devices (26) can open now or after the welding operation.

After the welding operation and with electrodes (18, 19) open and withdrawn, the feed device (25) can carry out a reversing motion with the clamping devices (26) open, the tensioning devices (23) fixing, furthermore, the base band saw blade (3). The clamping devices (26) then close again and carry out a new feed step with the base band saw blade (3) with the tensioning devices (23) open. The feed device (25) may, as an alternative, carry out a plurality of feed steps one after the other and return into the starting position only after a longer distance.

The manufacturing device (1) has, further, a cutting element feed (8), which provides the feed of individual cutting elements (4) to the movable electrode (18). The cutting element feed (8) has a readiness position (28) for individual cutting elements (4). This readiness position is formed by a collecting tank (29) for a reservoir of individual cutting elements (4) in the embodiment shown according to FIGS. 3, 4 and 6. The collecting tank (29) is provided with a separating device, which removes the cutting elements (4) individually one after the other from the collecting tank and transfers them to a feed device (30), which then conveys them further to the movable electrode (18).

The feed device (30) has, e.g., a carriage which can be reversingly displaced in said axial direction (38) with a swivel arm, which has a mount for the separated cutting element (4) and is possibly also connected to a suction device. The transfer of the separated cutting element (4) to the movable electrode (18) and the mounting element (126) thereof takes place in a raised withdrawn position of the electrode (18) and of the welding head (14) and at a distance above the base band saw blade (3).

The readiness position (28) may, as an alternative, be formed by a separating device that separates the, e.g., cylindrical or triangular-shaped cutting elements (4) from a rod and transfers them to the feed device (30).

The welding head (14) advances the electrode (18) with the mounted cutting element (4) to the receiving point (5) which is arranged and fixed in the process area. The advancing may take place transversely to said axial direction (38) and from above along a working line (WL). The preferably linear advancing direction may be aligned especially essentially vertically to the slope of the receiving point (5). FIGS. 9 through 14 described below illustrate this arrangement.

For adapting to different base band saw blade geometries, the welding head (14) may be connected to an adjusting device (15), by means of which it can be pivoted about an axis of rotation (16) that passes through the process area and is aligned transversely to the base band saw blade (3) or in the y direction. The adjustment may be carried out manually or by means of a controlled drive and the angle scale shown in the drawings, and especially FIGS. 6 and 7. The adjusting device (15) is arranged at a body (34), which can in turn be mounted fixed to the frame or be connected to an adjusting device (9) explained below.

The movable electrode (18) is located in the withdrawn position at a distance and obliquely above the base band saw blade (3) and the respective receiving point (5). For the welding operation, the electrode (18) is moved forwards by the advancing device (17) and presses the cutting element (4) against the receiving point (5) or the target surface (T). The stationary electrode (19) contacts the base band saw blade (3), so that after switching on the controlled current feed and its current source the welding current flows through the cutting element (4) and the base band saw blade (3). In this case, the shielding gas device (22) is also switched on. During the welding, the movable electrode (18) may, if necessary, also be reset by the advancing device (17). The pressing pressure and the pressing path or the sinking-in path during the welding operation and the plasticizing of the contact areas can be controlled and possibly adjusted. The next feed step is carried out upon completion of the welding operation.

The manufacturing device (1) may have an automatic adjusting device (9) for the relative position of the base band saw blade (3) and the welding head (14). The adjusting device (9) can be used for the setup during the startup of the manufacturing device (1) and during a change in format of the base band saw blade (3). It may also be used for continuous or intermittent process monitoring and, if necessary, automatic readjusting.

Position deviations may occur, e.g., in case of the receiving point (5) or the target surface (T). A position deviation may have different causes, e.g., a change, and especially a change in format, a manufacturing tolerance or a guiding inaccuracy of the base band saw blade (3). Different process conditions, which may result in varying welding results, may thereby arise during the advancing of the movable electrode (18) and of the cutting element (4). Details are given in this regard in FIGS. 9 through 14 described below. These inaccuracies are eliminated and compensated by the possibly automatic adjusting device (9).

In the embodiment shown in FIGS. 1 through 8, the automatic adjusting device acts on the relative position of the welding head (14) and positions same correctly towards the receiving point (5) and the base band saw blade (3) which is fixed by means of the tensioning device (23). The adjusting and positioning kinematics may also be reversed, the base band saw blade (3) being positioned towards the welding head (14). Further, a moving and positioning on both sides is also possible.

The automatic adjusting device (9) has a preferably optical detection device (31) for the position of the base band saw blade (3), especially of the current receiving point (5) in the process area. The position detection is correspondingly changed in case of the above-mentioned deviating kinematics.

The optical detection device (31) looks at the adjusting area or process area and the receiving point (5) and is arranged for this in a suitable manner in the area of the pressure welding device (6). The detection device (31), which is preferably configured as an electronic measuring camera, is, e.g., likewise arranged at the body (34) and is located on the rear side of the body located opposite the welding head (14). In this case, the detection device (31) is arranged with its viewing axis flush with or at least parallel to the axis of rotation (16) and looks through the body (34) to the process area. The axis of rotation (16) has, for this, e.g., a correspondingly large mounting sleeve traversing the body (34).

The automatic adjusting device (9) has, further, a positioning device (32) that can be controlled and possibly adjusted according to the detection result of the detection device (31) and can be changed, if necessary, with the relative position of the base band saw blade (3) and the welding head (14). The detection and possibly changing of the relative position are carried out in the process area.

In the exemplary embodiments shown in FIGS. 1 through 8, the positioning device (32) is connected to the welding head (14) and thus also to the electrode (18) thereof, which is likewise to be positioned. The positioning device (32) has one or more positioning axes. In the exemplary embodiment shown with the oblique advancing direction of the welding head (14) or its electrode holder and of the electrode (18), a single-axis positioning may be sufficient. This positioning axis is, e.g., aligned vertically or in the z direction. The welding head (14) is thereby adjusted vertically above the teeth (112) and the oblique receiving point (5) or target surface (T). The positioning device (32) may be configured as a single-axis lifting device for this purpose.

In the exemplary embodiments shown, the positioning or lifting device (32) acts on the body (34) and is arranged under it. The positioning device (32) may also be connected to other components of the manufacturing device (1), especially to the detection device (31) and to a testing device (11) explained below. In the exemplary embodiments shown, the detection device (31) is fastened to the body (34) and is carried along during the positioning motion. The image analysis of the optical detection may be configured and programmed correspondingly.

During the optical detection, it is determined, e.g., by means of a measurement where the detected reference point is located on the base band saw blade (3) in relation to a reference specification of the detection device (31), e.g., in relation to the central viewing axis or in relation to the center of the optical image and measuring field. As an alternative, in case of a correspondingly large viewing angle, a reference point on the welding head (14), e.g., at the tip of the electrode (18) may also be optically detected and measured in its position in relation to the detected reference point on the base band saw blade (3). The detected reference point on the base band saw blade (3) may be the entire receiving point (5) or a characteristic partial area hereof.

In the exemplary embodiments being shown, the relative position to the detected reference point on the base band saw blade (3) compared to a reference specification of the detection device (31 is detected and measured. During the positioning motion, the reference specification of the detection device (31) is moved along. The optical detection and said measurement can be continued during the positioning motion until the desired set position relation is reached. The positioning motion and the positioning device (32) can thereby be adjusted via the optical detection. The found position is then fixed, so that the welding operation can begin.

The automatic adjusting and positioning can be carried out during the mentioned setup of the manufacturing device (1) and during a change, especially a change in format of the base band saw blade (3). This may be a one-time adjusting, which remains in place for the next welding operation. The automatic adjusting and positioning may also be carried out during the welding operation. It may be repeated for each tooth (112) and each welding operation. It may also be carried out only for individual teeth and welding operations and at intervals or repeated periodically or at irregular intervals.

The manufacturing device (1) may, further, comprise a testing device (11) for the welding result. In this case, the band saw blade (2) can be detected and tested with the corresponding, just welded-on cutting element (4). The testing can be carried out permanently during each welding operation or at intervals, e.g., periodically. The testing device (11) and/or the control device (10) may, in addition, each generate a start signal for the next feed step in the case of permanent testing and positive test result.

The detection and testing may be carried out optically. For this, the testing device (11) may have a detection device (33), e.g., an electronic measuring camera, which is arranged above and in axial or feed direction (38) or in the x direction in front of the process area. In this connection, the detection device (33) looks obliquely from above and in the axial or feed direction on the process area.

The testing concerns, e.g., the size, shape and alignment of the cutting element (4) by itself and in relation to the base band saw blade (3). In particular, the central arrangement and the size of the lateral excess of the cutting element (4) on the base band saw blade (3) in the y direction can be detected and tested. In the exemplary embodiments shown, the detection device (33) is mounted on the body (34) as well and is moved along during the positioning motion thereof. As an alternative, the testing device may be fastened stationarily to the machine frame (13).

The positioning device (32) may have two positioning axes and, in addition, may have an adjusting device (not shown) for the adjustment, especially displacement, of the welding head (14) with its electrode (18) to be positioned in the y direction transversely to the base band saw blade (3) and to the feed direction (38). The welding head (14) and its electrode (18) may thereby be aligned, and especially centered compared to the actual position detected by the detection device (33).

Moreover, the optical detection device (31) of the adjusting device (9) may, as an alternative or in addition, be used for said testing purposes and form the testing device (11) or a part thereof. The optical detection device (31) may determine the welding result and the correct position of the cutting element (4) at the receiving point (5) or at the tooth (112), especially in the x direction and z direction.

The manufacturing device (1) has, further, an aftertreatment device (12) for the band saw blade (2) with the welded-on cutting elements (4). The aftertreatment can be carried out, e.g., thermally and by a heating of the band saw blade (2). It is carried out in the axial or feed direction (38) behind the pressure welding device (6) and possibly the testing device (11).

In the exemplary embodiments shown, the aftertreatment device has a heating device (35) for the band saw blade (2). This is, e.g., an inductive heating device, which has one or more electric coils (36), through the electromagnetic field of which the band saw blade (2) is moved during the conveying.

The aftertreatment device (12) may have a sensor mechanism (40) for detecting the treatment result. This may be, e.g., a temperature sensor, especially an infrared sensor, which detects the current temperature of the band saw blade (2) in a preferably contactless manner. The heating device (35) can be controlled. It can, as an alternative, be adjusted as a function of the detection result. The aftertreatment device (12) can be arranged fixed to the frame or movable, especially advance able. The coil (36) is shown spaced apart from the base band saw blade (3) for the sake of better clarity in the drawings.

The control device (10) controls all the components and functions in the manufacturing device (1). It may have a display and operating device shown in FIG. 1. The control device (10) is especially connected to the pressure welding device (6) and the current source or current feed as well as to the band saw blade feed (7), the cutting element feed (8), the adjusting device (9), the testing device (11) and the aftertreatment device (12). The manufacturing device (1) may operate in a fully automated manner. An operator is needed only for the first feed and insertion of the base band saw blade (3), which is possibly removed from a coil, and for filling the collecting tank (29). These operations may also be automated.

FIGS. 9 through 14, which show details on the above-described manufacturing device (1), shall be explained below.

Figure 9:
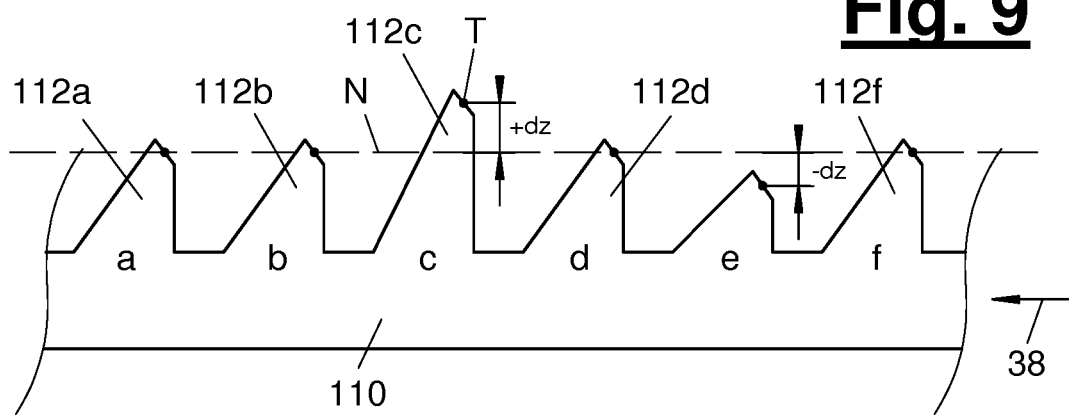
FIG. 9 is a schematic view of a base blade of the saw blade.
Figure 10:
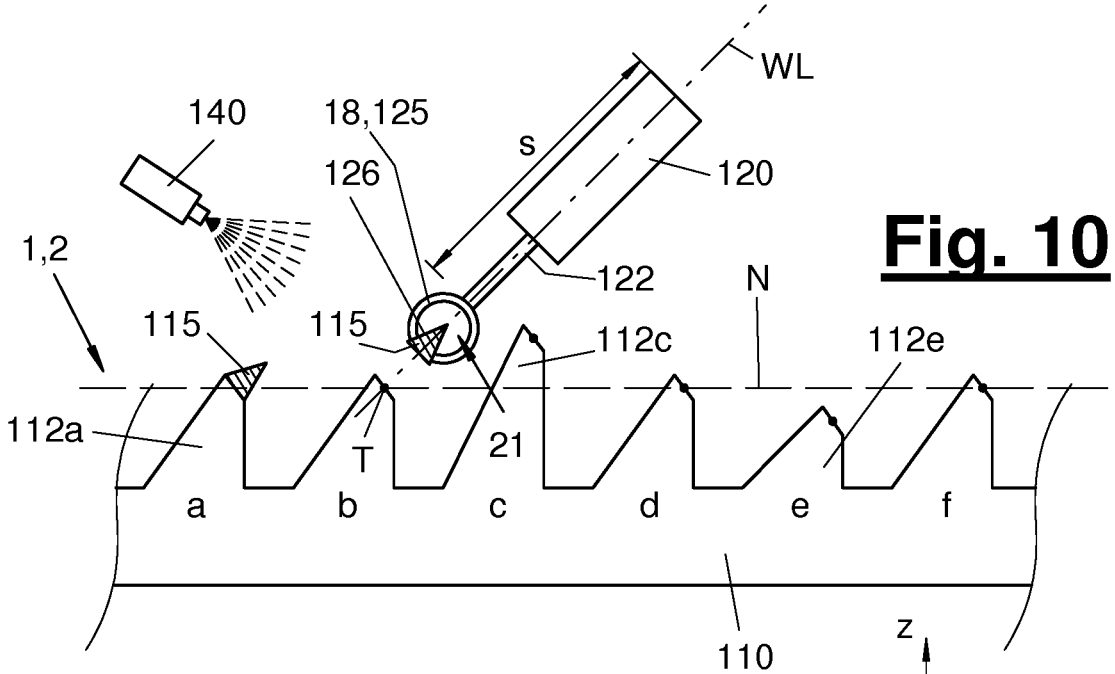
FIG. 10 is a variant of the manufacturing device with a processing unit, where the saw blade from FIG. 9 is inserted.

For manufacturing saw blades, especially band saw blades (2), we also start with a workpiece in this example, as schematically shown in FIG. 9. It is a band saw blade (110), for example, made of sheet metal, with a thickness of a few tenths of a mm up to a few mm, which are brought into the shown shape by sawing, cutting or punching. In practice, the workpiece (110) is usually delivered in relatively great length on coils, wherein it is wound into a coil in a direction transversely to the surface of the drawing. The workpiece or band saw blade (110) corresponds to the above-described base band saw blade (3).

The shape of the workpiece (110) is characterized by a consecutiveness of predefined segments (a . . . f), in which, in principle, an identical saw tooth (112) is always mounted at a fixed pitch distance from another. Instead of being formed from consecutive identical saw teeth, the workpiece may incidentally, under the circumstances, also comprise more complex segments, for example, with a series of saw teeth, which can be different from one another in shape and pitch distance.

A nominal, i.e., intended height of the saw teeth (112) is shown schematically in FIGS. 9 and 10 with a dotted line (N) on the drawing. This dotted line intersects an obliquely positioned target surface (T) of the saw teeth (112) about half way, where a saw tooth tip (115) must then be mounted, see FIG. 10. The target surface (T) corresponds to the above-described receiving point (5). As a result of almost unavoidable production tolerances, this target surface (T) is higher or lower in some saw teeth (112c, 112e) than intended. This deviation (dz) in vertical direction is shown schematically on the drawing and may occur because of an incorrect saw tooth shape, an incorrect positioning of the blade, an incorrect pitch distance of the saw tooth, with regard to a preceding saw tooth, or many other factors. The processing unit according to the present invention is capable of correcting such a deviation in a suitable and efficient manner.

Figure 3:
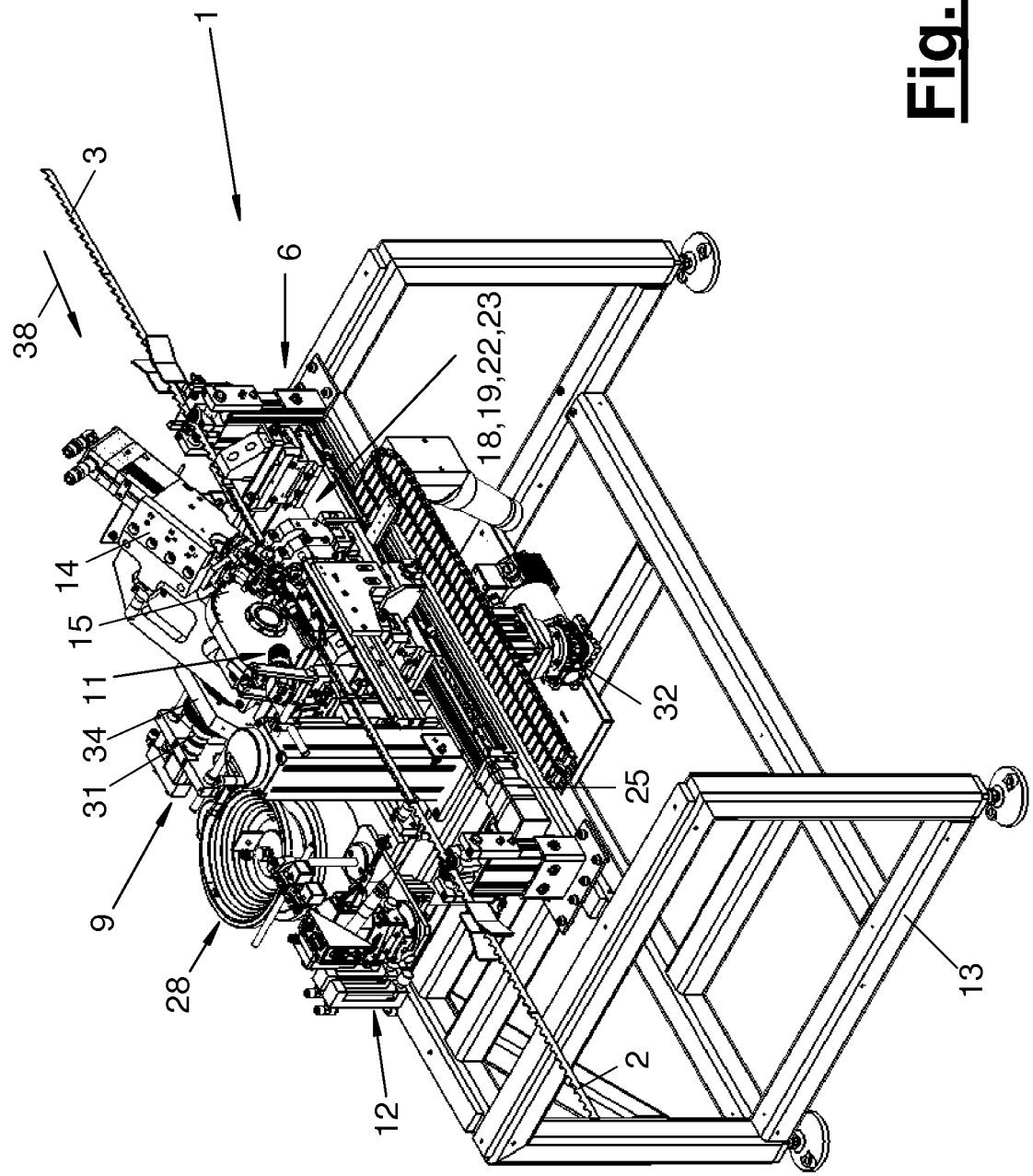
FIG. 3 is a perspective view of the manufacturing device from FIGS. 1 and 2 without shielding device.
Figure 4:
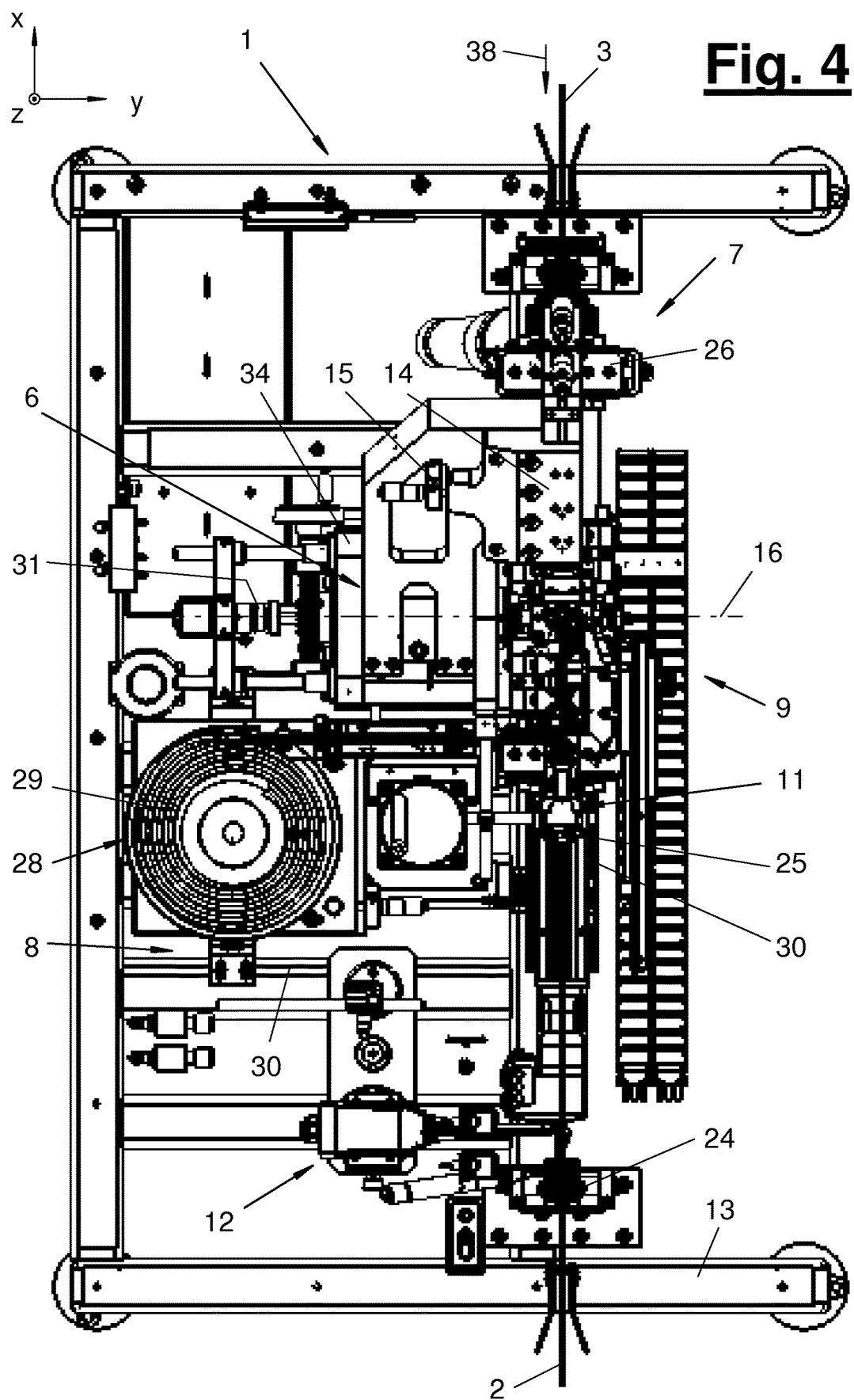
FIG. 4 is an enlarged top view of the arrangement from FIG. 3.

An embodiment of such a processing unit is schematically shown in a lateral view in FIG. 10 and a top view in FIG. 3. The processing unit contains processing means that are configured to be able to carry out a desired processing with a processing element (12) intended for this purpose at the point of the target surface (T) in the consecutive segments (a . . . f). The processing unit corresponds to the above-described manufacturing device (1). The processing element (125) is a variant of the above-described welding head (14) and the advancing device (17).

Figure 12:
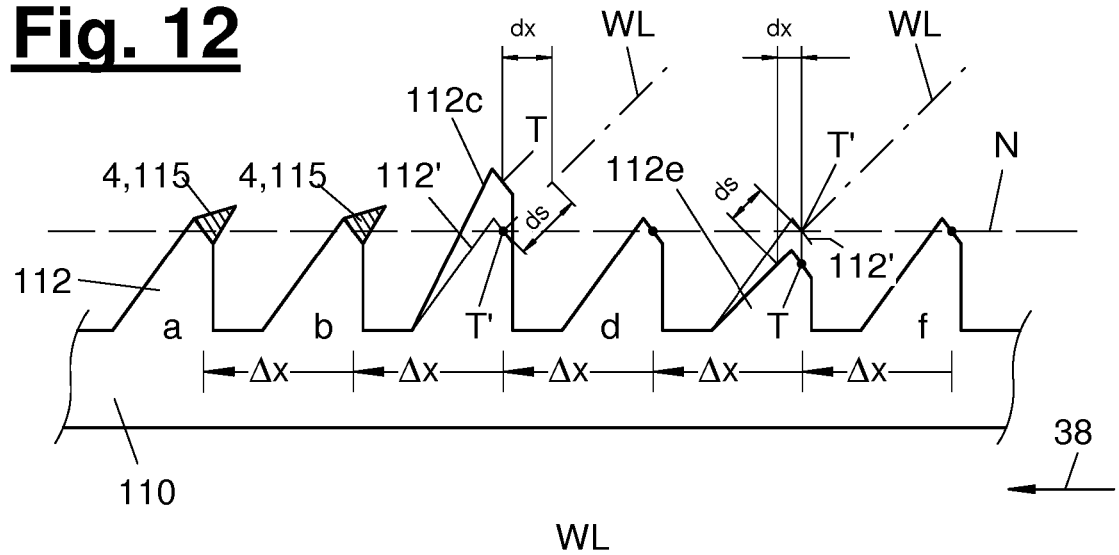
FIG. 12 is a view showing one of consecutive stages of an embodiment of the method, which is carried out with the processing unit from FIGS. 10 and 11.
Figure 13:
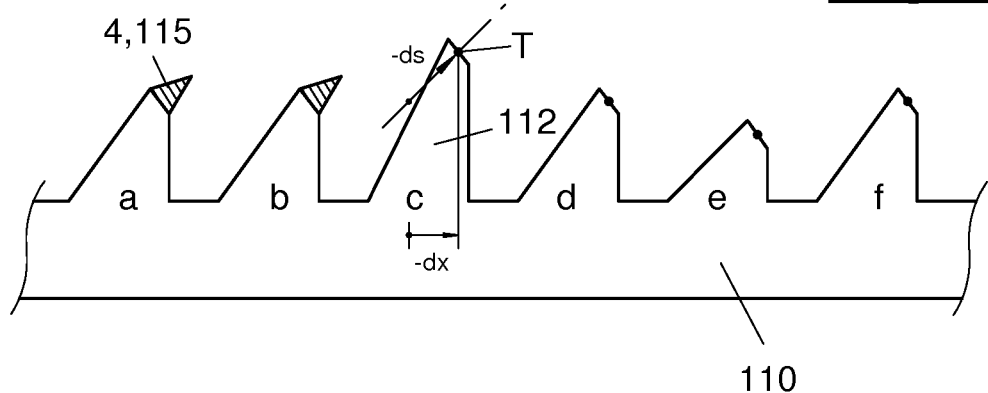
FIG. 13 is a view showing another of consecutive stages of an embodiment of the method, which is carried out with the processing unit from FIGS. 10 and 11.
Figure 14:
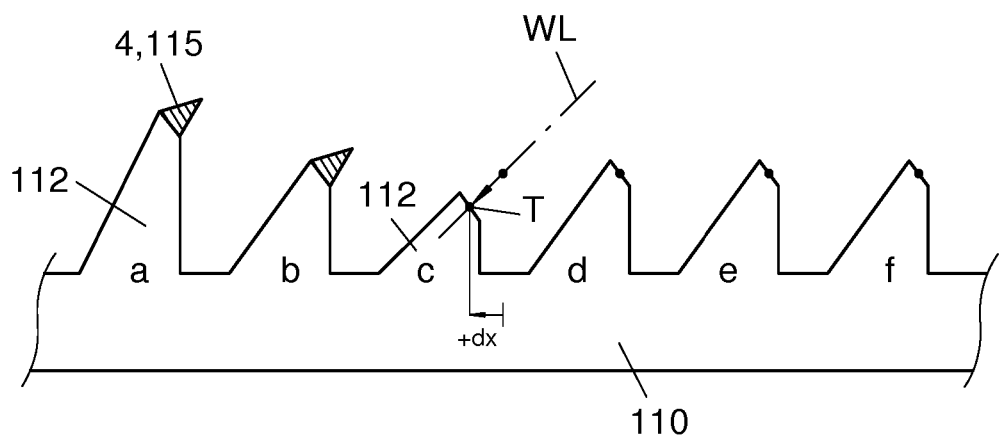
FIG. 14 is a view showing another of consecutive stages of an embodiment of the method, which is carried out with the processing unit from FIGS. 10 and 11.

For this, the workpiece (110) according to FIG. 12 is gradually guided past with steps X into a displacing direction (38) or in direction x on a working line (WL) of the processing element (125). The processing element (125) originates from a first manipulator (120), which moves the processing element (125) along this working line (WL) and brings it to the target surface (T). The first manipulator (120) comprises, for example, a linear control element, e.g., a pneumatic pressure cylinder, with a linearly controllable connecting rod or piston rod (122) that carries the processing element (125) at the end.

The processing element (125) comprises a welding electrode (18) that is coupled to one of the poles on a suitably electronically controlled high voltage current feed. The opposite pole of the feed is connected to the workpiece (110), so that a circuit is closed and the processing element (125) comes into contact with the target surface (T) or with the receiving point (5) of the saw blade (110). The welding electrode (18) has a schematically shown gripping mouth (126), in which a part to be welded (4, 115) can be picked up from a reservoir or from the feed device (30) and is positioned onto the target surface with a correct orientation. The gripping mouth (126) corresponds to the above-described positive-locking mount (126) and can be connected to the suction device (21).

In this case, the cutting element (4) is said saw tooth tips (115), which were manufactured from a hard metal and which must be attached to the saw teeth (112a . . . 112f) in order to give the saw blade (2) its desired properties. Even though the saw tooth tips (115) on the drawings viewed in the y direction are shown as a more or less pure triangle, they have a slightly concave surface in practice, with which they are set against a saw tooth (112), so that a welding current is initially exposed to a significant contact resistance, which will be concentrated on a limited part. This leads to the desired heat development and weld formation. In addition, entirely differently shaped saw tooth tips may also be applied, corresponding to the specific demand, or, besides other polygonal shapes, also cylindrical and partly spherical tips according to FIG. 7.

Figure 11:
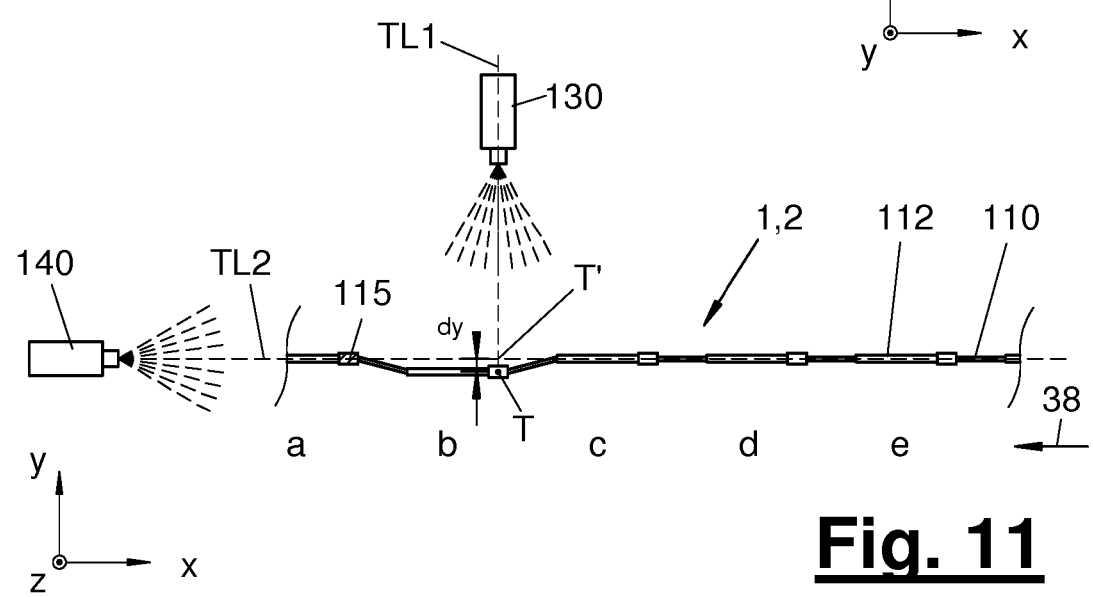
FIG. 11 is a top view of the processing unit with the inserted saw blade from FIGS. 9 and 10.

It is shown in FIGS. 10 and 11 how such a saw tooth tip (115) is correctly attached to a saw tooth (112a) of the row shown and shall be attached to the next saw tooth (112b). However, a third saw tooth (112c) is higher than the nominal line (N) in the z direction, as a result of which an incorrect placement would result here, if this incorrect position were not corrected. Analogously, the same applies to the fifth saw tooth (112e) in the row shown, which lies lower.

With a view to such corrections for the actual place of the target surface (T), the processing unit comprises detection means in the form of a camera system (130) with an electrical image sensor. According to FIGS. 10 and 11, the camera system (130) looks at the process point on the tooth (112b), onto the target surface (T) of which a saw tooth tip (115) shall have just been welded.

In this example, the processing unit comprises, in addition, a second camera system (140), which is configured to be able to numerically determine a possible deviation (dy) in the width direction (y) consistently and to generate a signal as an indicator of a correction to be made, see FIG. 11. The detection means or camera systems (130, 140) correspond to the above-described optical detection devices (31, 33) and are components of the above-described adjusting device (9) and possibly of the testing device (11).

FIG. 12 shows both the actual position of the third saw tooth and fifth saw tooth (112c, 112e) and, with dotted line, the saw tooth (112') in question with the nominal, expected position and shape. Also shown is the working line (WL), which approximately vertically intersects the nominal target surface (T) about half way, but is at a distance (dx) from the corresponding position on the actual target surface (T). This deviation (dx) of the working line (WL) of the processing unit (125) is detected as such and is determined as a numerical value by the first camera system (130), which records an image around the target surface in a lateral view. The camera system (130) measures this distance as a deviation from the first target line (TL1), which is shown for representation purposes in FIG. 11 and which intersects the working line (WL) vertically at the level of the target surface (T).

For correction, the workpiece (110) is reset into the displacing direction at a corresponding distance (dx). In the example, the displacing means are controlled, for this, by correction means intended for this, in agreement with the correction (dx) to be carried out with it, so that the situation of FIG. 13 in case of a saw tooth (112c) that is too high or the situation of FIG. 14 in case of a saw tooth (112e) that is too low is reached. In this variant of the adjusting device (9), the relative position of the processing element (125) and the workpiece (110) is brought about by an adjustment of the workpiece (110) in the x direction by means of the band saw blade feed (7) or the feed device (25). In this case, the positioning device (32) is formed by the feed device (25).

Since the target surface (T) is thus positioned correctly on the working line (WL), this line is now located at a lower distance (−ds) or greater distance (+ds) to the starting position of the processing element (125). For the correction, the manipulator (120) of the processing element (125) generates a correspondingly smaller or greater feed for this.

This correction can be derived in a simple manner from the measured correction dx of the deviation in the x direction and behaves like ds=dx/cos at . . . ½ n and ds=0 at =½ n, being the angle that forms the working line (WL) with regard to the displacing direction (x) of the workpiece. With =½ n, or a cleaner vertical positioning of the working line, a correction is only made in the vertical z direction as in the above-described exemplary embodiment of FIGS. 1 through 8.

To correct for a possible deviation (dy), in the lateral direction y of the target surface (T), of the actual saw tooth (112), with regard to said nominal position (T'), this deviation is correspondingly located with the second camera system (140), which records an image around the target surface (T) in the displacing direction x, see FIG. 11. This deviation is also measured with regard to the nominal target line (TL2), which intersects the working line (WL) at the level of the target surface and which is sloped toward the x direction.

The first manipulator (120) is coupled to a second manipulator, which is not shown in greater detail, which can apply a deflection to the first manipulator (120) in the y direction, in order to correct for a possible, i.e., located, deviation dy in the y direction of the target surface (T). For the second manipulator, we also start with a linear control element, e.g., a pneumatic pressure cylinder, which can be controlled proportionally. In this way, the working line WL is offset to the actual target surface (T) by the processing element (125).

Further, both camera systems (130, 140) are used for the complete quality control of each saw tooth (112), after a saw tooth tip (115) was fastened to it. Should a saw tooth tip (115) be unexpectedly missing, for example, because the reservoir was depleted, a saw tooth was left out or a saw tooth tip (115) was not fastened well, or a saw tooth tip is unexpectedly not correctly attached, then this is also immediately determined and signaled by the detection devices (130, 140).

The located deviations from the nominal position are also stored and analyzed. If a systematic deviation or a systematic pattern is derived therefrom, the control software of the processing unit can correct for it, for example, by the displacing devices, with which the workpiece is positioned, being balanced beforehand.

The processing unit and the method contribute considerably to the quality of the end result and need only intervene minimally in the normal working process.

A variety of variants of the exemplary embodiments shown and described as well as of the above-mentioned variants are possible. In particular, the features of the exemplary embodiments and of the variants mentioned can be combined with one another and possibly also transposed.

In the embodiment of FIGS. 9 through 14, we start with target lines that are aligned approximately vertically to the nominal position of the workpiece; however, target lines with an oblique position may also be selected instead, especially when it would deliver a better line of sight.

Further, in this exemplary embodiment, we start with a working line of the processing element that runs approximately along a central vertical line on the target surface (T). The processing element may, instead, also approach from a different corner of the target surface and meet the target surface in the center as well. In practice, the processing element may also be coupled to another control element, as a result of which the working line is settable and always adjustable.

The cutting elements (4) can be transferred to the stationary electrode (19), the base band saw blade (3) being held movably with the other electrode (18) and being advanced to the cutting element (4). In another variant, a mutual advancing is possible. Further, the position of the electrodes (18, 19) can be reversed.

A soldering technique with electrical resistance heating under pressing pressure can be used instead of the above-described electrical resistance pressure welding technique.

The automatic adjusting device (9) may be omitted in a variant of the exemplary embodiments shown. It may, as an alternative, move the base band saw blade (3) and may be associated, e.g., with the band saw blade feed (7). The detection device (31) may be configured and arranged differently. It may operate, e.g., cyclically and with touch contact. It may, in addition, be separated from the body (34) and be arranged stationarily. It may also be located, in a reversal of the position shown, on the front side or operating side of the manufacturing device (1).

The testing device (11) may likewise be omitted or, as an alternative, be configured differently. A quality test of the welding result can be carried out, e.g., by a resistance test on the weld by means of an applied electric voltage or in another way. A testing of the position and dimension, especially of the central position of the welded-on cutting elements (4) can be carried out cyclically with touch contact. The testing result can, in addition, lead to an afterprocessing, e.g., machining. This can be carried out possibly at the aftertreatment device (12).

The aftertreatment device (12) may also be omitted or, as an alternative, be configured differently. In particular, other types of aftertreatments or afterprocessings on the welded band saw blade (2) can be carried out here. This may be, e.g., a coating, a machining or the like.

In the embodiments of the manufacturing device (1) shown, one of each of said components is present. As an alternative, a multicomponent arrangement is possible. Further, a plurality of band saw blades (2) can be manufactured simultaneously in the manner described.

Further, the manufacturing device (1) and the manufacturing method can be used in a corresponding adaptation to other saw blades (2), especially circular saw blades.

While specific embodiments of the invention have been shown and described in detail to illustrate the application of the principles of the invention, it will be understood that the invention may be embodied otherwise without departing from such principles.

The invention claimed is:

1. A saw blade manufacturing device, for welding or for soldering individual cutting elements at saw tooth receiving points on a base band saw blade, the device comprising:
   a cutting element feed;
   an electrical pressure welding device comprising an advanceable welding head; and
   an automatic adjusting device configured to detect a relative position of the base band saw blade, positioned for a welding or soldering operation, and the welding head in a process area and to adjust or readjust the relative position, if necessary, wherein:

the automatic adjusting device has an optical detection device detecting a position of a current saw tooth receiving point or a target surface on a saw tooth of the base band saw blade in the process area or in an adjusting area;

the optical detection device is configured as an electronic measuring camera with a view area looking at the adjusting area or the process area and the receiving point or the target surface;

the automatic adjusting device has a positioning device controlled according to a detection result of the optical detection device and changes the relative position of the base band saw blade and the welding head based on the detection result of the optical detection device;

the automatic adjusting and positioning is carried out during a welding or soldering operation; and the automatic adjusting and positioning is repeated for each tooth receiving point or a target surface and during each welding or soldering operation or is carried out only for individual tooth receiving points or target surfaces and welding operations and at intervals or repeated periodically or at irregular intervals.

2. A saw blade manufacturing device in accordance with claim 1, further comprising a testing device for testing a welding result for the base band saw blade with a welded-on cutting element.

3. A saw blade manufacturing device in accordance with claim 1, further comprising an aftertreatment device for treatment of the saw blade with the welded-on cutting elements.

4. A saw blade manufacturing device in accordance with claim 3, the aftertreatment device has an inductive heating device, for heating the base band saw blade and the heating device is adjustable and has a contactless temperature sensor.

5. A saw blade manufacturing device in accordance with claim 1, wherein the electrical pressure welding device has a shielding gas device.

6. A saw blade manufacturing device in accordance with claim 1, wherein the electrical pressure welding device has a stationary, lower electrode and an associated stationary tensioning device for the base band saw blade and the welding head has a movable, upper electrode and an electrode holder with an advancing device.

7. A saw blade manufacturing device in accordance with claim 6, wherein:
the electrical pressure welding device has a shielding gas device; and
the shielding gas device is arranged at one or both electrodes.

8. A saw blade manufacturing device in accordance with claim 6, wherein the movable electrode has a mount adapted in shape with a suctioning device for a cutting element.

9. A saw blade manufacturing, device in accordance with claim 1, wherein the cutting element feed has a feed device feeding the individual cutting elements to the welding head located in a retracted position and the cutting element feed has a displaceable carriage and a swivel arm with a suctioning device for receiving the individual cutting elements.

10. A saw blade manufacturing device in accordance with claim 1, wherein the optical detection device is arranged at a distance from the process area with the view area looking at and looks at the process area transversely to a base band saw blade plane.

11. A saw blade manufacturing device in accordance with claim 1, wherein the welding head has a movable upper electrode and an electrode holder with an advancing device having a pneumatic or electromechanical linear drive.

12. A saw blade manufacturing device in accordance with claim 1, wherein the positioning device is connected to the welding head for moving and positioning the welding head.

13. A saw blade manufacturing device in accordance with claim 12, further comprising a body connected to the positioning device, wherein the welding head, a setting device, the optioncal detection device and a testing device are arranged at the body.

14. A saw blade manufacturing device in accordance with claim 1, further comprising a base band saw blade feed configured to support, guide and fix a position of the base band saw blade in the process area or the adjusting area for the welding or soldering operation.

15. A saw blade manufacturing device in accordance with claim 14, wherein the saw blade feed device has an axially and reversingly displaceable, controllable clamping device with a drive for a controlled movement of the base band saw blade.

16. A method for manufacturing band saw blades for welding or soldering individually fed cutting elements at saw tooth receiving points on a fed base band saw blade, the method comprising:

providing a band saw blade manufacturing device comprising a base band saw blade support to fix a position of the base band saw blade for a welding or soldering operation, a cutting element feed, an automatic adjusting device and an electrical pressure welding device with an advanceable welding head, wherein the automatic adjusting device comprises an optical detection device configured to detect a relative position of the base band saw blade and the welding head in a process area and to adjust or readjust the relative position;

detecting a relative position of the base band saw blade and of the welding head in a process area or in an adjusting area with the automatic adjusting device; and adjusting or readjusting the relative position of a current saw tooth receiving point or a target surface on a saw tooth of the base band saw blade and the welding head if necessary, wherein the relative position of the base band saw blade and the welding head is detected optically and measured with the optical detection device during said detecting a relative position;

the optical detection device is configured as an electronic measuring camera with a view area looking at the adjusting area or the process area and at the current saw tooth receiving point or the target surface;

the automatic adjusting device has a positioning device controlled according to a detection result of the optical detection device and changes the relative position of the base band saw blade and the welding head based on the detection result of the optical detection device;

the positioning device is controlled or adjusted according to the detection result of the detection device; and the automatic adjusting and positioning is repeated for each tooth receiving point or a target surface and during each welding or soldering operation or is carried out only for individual tooth receiving points or target surfaces and welding operations and at intervals or repeated periodically or at irregular intervals.

17. A method in accordance with claim 16, wherein the cutting elements are each advanced and welded or soldered at an oblique receiving point or target surface of a tooth on the base band saw blade with an essentially perpendicular working line.

18. A method in accordance with claim 16, wherein for the detection of the relative position of the base blade and the welding head, the entire receiving point or a characteristic partial area hereof is detected and the position relative to a reference point on the welding head or to a reference specification of the detection device is detected and measured.

19. A method in accordance with claim 16, wherein the cutting elements are welded or soldered with shielding gas.

20. A method in accordance with claim 16, wherein the a process result is checked optically with a testing device, wherein the process result is a welding of the base band saw blade with one of the cutting elements.

21. A method in accordance with claim 16, wherein the base band saw blade with one of the cutting elements welded or soldered on is heat-treated with a temperature control with a distance in time and space after the welding or soldering.

22. A method in accordance with claim 16, wherein the welding head advances an electrode with the mounted cutting element to the receiving point wherein the advancing takes place with a linear advancing direction.

23. A band saw blade manufacturing device for welding or for soldering individual cutting elements to a base band saw blade having a top side contour with tooth projections spaced apart in an axial direction of the band saw blade, which tooth projections have a top side tapered area designated as a target surface forming a receiving point for an individual cutting element, the band saw blade manufacturing device comprising:
- a base band saw blade feed configured to support, guide and fix a position of the base band saw blade in a process area or an adjusting area for a welding or soldering operation;
- an electrical pressure welding device comprising a welding head moveable relative to the receiving point or the target surface;
- a cutting element feed for feeding of the individual cutting elements to the welding head; and
- an automatic adjusting device configured to detect a position of the base band saw blade relative to the welding head and in the process area or adjusting area and to adjust or readjust the relative position, if necessary, the automatic adjusting device comprising:
- an optical detection device configured as an electronic measuring camera with a view area looking at the adjusting area or the process area and looking at the receiving point or the target surface and detecting a position of the receiving point or the taraet surface of the base band saw blade in the process area or in the adjusting area and providing a detection result indicative of the detected position; and
- a positioning device connected to welding head to change the position of the weld ing head relative to the base band saw blade based on the detection result of the optical detection device.

\* \* \* \* \*